United States Patent
Motgi et al.

(10) Patent No.: US 12,524,560 B2
(45) Date of Patent: Jan. 13, 2026

(54) MULTIFACTOR AUTHENTICATION BASED ON USER EXPERIENCES

(71) Applicant: Dell Products L.P., Round Rock, TX (US)

(72) Inventors: Prem Pradeep Motgi, Austin, TX (US); Dharmesh M. Patel, Round Rock, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 18/458,404

(22) Filed: Aug. 30, 2023

(65) Prior Publication Data

US 2025/0077694 A1    Mar. 6, 2025

(51) Int. Cl.
*G06F 21/62*    (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 5,649,060 A | 7/1997 | Ellozy et al. | |
| 5,821,871 A * | 10/1998 | Benzler | G07C 9/23 235/382 |
| 6,606,620 B1 | 8/2003 | Sundaresan | |

(Continued)

FOREIGN PATENT DOCUMENTS

| | | |
|---|---|---|
| CN | 202058147 U | 11/2011 |
| CN | 115292285 A | 11/2022 |

(Continued)

OTHER PUBLICATIONS

Page, Sébastien, "How to move your Health data from one iPhone to another," iDB, Web Page <https://www.idownloadblog.com/2016/10/13/health-data-importer-makes-moving-your-health-data-from-one-iphone-to-another-a-breeze/> accessed on Oct. 30, 2022 (9 Pages).

(Continued)

*Primary Examiner* — Jason Chiang
(74) *Attorney, Agent, or Firm* — WOMBLE BOND DICKINSON (US) LLP

(57) ABSTRACT

Methods and systems for managing requests for functionalities of a data repository are disclosed. The data repository may store sensitive data (e.g., personal data), and may offer functionality (e.g., data access) in order to facilitate computer-implemented services. To prevent unauthorized access to and/or use of the sensitive data, an access control system may be implemented. For example, in order to gain access to data stored in the data repository, the access control system may prompt a requesting user to provide responses to security questions during authentication. The security questions may be based on details of personal experiences of the authorized user (e.g., identified from the personal data of the authorized user) and may be updated automatically when new data is introduced to the data repository. Therefore, the responses to the security questions required for authentication may be memorable to the authorized user and/or difficult to predict for unauthorized users.

20 Claims, 9 Drawing Sheets

(56) References Cited

U.S. PATENT DOCUMENTS

| | | | |
|---|---|---|---|
| 6,721,713 B1* | 4/2004 | Guheen | G06Q 99/00 |
| | | | 715/202 |
| 7,315,826 B1* | 1/2008 | Guheen | G06Q 30/0201 |
| | | | 705/7.29 |
| 8,117,235 B1 | 2/2012 | Barta | |
| 8,255,386 B1 | 8/2012 | Annau et al. | |
| 8,255,948 B1 | 8/2012 | Black et al. | |
| 8,335,688 B2 | 12/2012 | Yegnanarayanan et al. | |
| 8,412,521 B2 | 4/2013 | Mathias et al. | |
| 8,495,720 B2 | 7/2013 | Counterman | |
| 8,955,076 B1* | 2/2015 | Faibish | H04L 63/0853 |
| | | | 726/7 |
| 9,009,844 B1* | 4/2015 | Corn | H04L 9/3271 |
| | | | 726/17 |
| 9,031,839 B2 | 5/2015 | Thorsen et al. | |
| 9,361,428 B2 | 6/2016 | Bessette | |
| 9,749,353 B1* | 8/2017 | Benskin | G06N 5/04 |
| 9,754,209 B1* | 9/2017 | Kronrod | G06F 21/31 |
| 9,781,097 B2 | 10/2017 | Grajek et al. | |
| 10,042,993 B2 | 8/2018 | Beigi | |
| 10,073,948 B2 | 9/2018 | Cohen et al. | |
| 10,157,275 B1 | 12/2018 | Venkatasamy et al. | |
| 10,169,599 B2 | 1/2019 | Fox | |
| 10,462,142 B2 | 10/2019 | Pattar et al. | |
| 10,521,572 B2* | 12/2019 | Nygate | G06F 21/31 |
| 10,701,056 B2 | 6/2020 | Murthy | |
| 10,896,681 B2 | 1/2021 | Aleksic et al. | |
| 10,904,237 B2 | 1/2021 | Murthy et al. | |
| 10,997,315 B2* | 5/2021 | Barday | G06Q 30/0203 |
| 11,010,392 B1 | 5/2021 | Hirsch et al. | |
| 11,094,402 B2 | 8/2021 | Brown et al. | |
| 11,217,331 B2 | 1/2022 | Vishnubhatla et al. | |
| 11,405,189 B1 | 8/2022 | Bennison | |
| 11,533,619 B1* | 12/2022 | Kahn | G06F 21/44 |
| 11,550,842 B2 | 1/2023 | Clark | |
| 11,631,401 B1 | 4/2023 | Nudd | |
| 11,763,821 B1 | 9/2023 | McNair | |
| 11,849,069 B1 | 12/2023 | Can | |
| 12,118,121 B2* | 10/2024 | Brannon | G06F 21/6245 |
| 12,135,708 B2 | 11/2024 | Chermside | |
| 2003/0046401 A1 | 3/2003 | Abbott | |
| 2005/0160166 A1 | 7/2005 | Kraenzel | |
| 2006/0007870 A1 | 1/2006 | Roskowski | |
| 2008/0154961 A1 | 6/2008 | Dougall | |
| 2008/0275701 A1 | 11/2008 | Wu et al. | |
| 2009/0171692 A1 | 7/2009 | Zilberman et al. | |
| 2009/0216746 A1 | 8/2009 | Aubin | |
| 2009/0328175 A1* | 12/2009 | Shuster | H04L 9/3226 |
| | | | 726/7 |
| 2010/0121657 A1 | 5/2010 | Rosenberger | |
| 2010/0169304 A1 | 7/2010 | Hendricksen et al. | |
| 2011/0072233 A1 | 3/2011 | Dawkins | |
| 2011/0131174 A1 | 6/2011 | Birch et al. | |
| 2011/0307435 A1* | 12/2011 | Overell | G06F 16/367 |
| | | | 706/46 |
| 2012/0265771 A1 | 10/2012 | Suh | |
| 2014/0181673 A1 | 6/2014 | Work | |
| 2014/0201199 A1 | 7/2014 | Hajaj | |
| 2014/0207885 A1 | 7/2014 | Baker et al. | |
| 2014/0344288 A1 | 11/2014 | Evans | |
| 2015/0101065 A1* | 4/2015 | Sullivan | G06F 21/6218 |
| | | | 726/28 |
| 2015/0169574 A1 | 6/2015 | Bau et al. | |
| 2015/0199268 A1 | 7/2015 | Davis et al. | |
| 2015/0244706 A1* | 8/2015 | Grajek | H04L 63/0815 |
| | | | 726/6 |
| 2015/0350210 A1* | 12/2015 | Thibadeau, Sr. | H04L 63/0884 |
| | | | 726/7 |
| 2015/0356127 A1 | 12/2015 | Pierre et al. | |
| 2016/0006839 A1 | 1/2016 | Sawazaki | |
| 2016/0062689 A1 | 3/2016 | Cherubini | |
| 2016/0087976 A1 | 3/2016 | Kaplan | |
| 2016/0164813 A1 | 6/2016 | Anderson | |
| 2016/0231928 A1 | 8/2016 | Lewis et al. | |
| 2016/0232159 A1 | 8/2016 | Parikh | |
| 2016/0275158 A1 | 9/2016 | Baset | |
| 2016/0306812 A1 | 10/2016 | McHenry et al. | |
| 2016/0378760 A1 | 12/2016 | Braz | |
| 2017/0013047 A1 | 1/2017 | Hubbard | |
| 2017/0018026 A1 | 1/2017 | Rigdon | |
| 2017/0161439 A1 | 6/2017 | Raduchel | |
| 2017/0262164 A1 | 9/2017 | Jain | |
| 2017/0344886 A1* | 11/2017 | Tong | G06N 5/022 |
| 2017/0365101 A1 | 12/2017 | Samec et al. | |
| 2018/0024845 A1 | 1/2018 | Card, II et al. | |
| 2018/0068108 A1 | 3/2018 | Fish | |
| 2018/0121502 A1 | 5/2018 | Prieur | |
| 2018/0181560 A1 | 6/2018 | Qiao | |
| 2018/0189352 A1 | 7/2018 | Ghafourifar | |
| 2018/0203612 A1 | 7/2018 | Kats et al. | |
| 2018/0225345 A1 | 8/2018 | Gilder | |
| 2019/0012931 A1 | 1/2019 | Candelore | |
| 2019/0079855 A1 | 3/2019 | Dewitt | |
| 2019/0279744 A1 | 9/2019 | Howley et al. | |
| 2019/0297035 A1 | 9/2019 | Fox et al. | |
| 2019/0325036 A1 | 10/2019 | Edge | |
| 2020/0012800 A1* | 1/2020 | Karako | H04L 63/0853 |
| 2020/0042685 A1* | 2/2020 | Tussy | G06V 40/50 |
| 2020/0043479 A1 | 2/2020 | Mont-Reynaud | |
| 2020/0110882 A1 | 4/2020 | Ripolles Mateu et al. | |
| 2020/0226216 A1 | 7/2020 | Marin et al. | |
| 2020/0258516 A1 | 8/2020 | Khaleghi | |
| 2021/0056131 A1 | 2/2021 | Ackermann et al. | |
| 2021/0065203 A1 | 3/2021 | Billigmeier et al. | |
| 2021/0256534 A1 | 8/2021 | An | |
| 2021/0390196 A1 | 12/2021 | Lavine et al. | |
| 2022/0019560 A1 | 1/2022 | Durairaj | |
| 2022/0027859 A1 | 1/2022 | Daga | |
| 2022/0078007 A1 | 3/2022 | Reddem | |
| 2022/0131717 A1* | 4/2022 | Kwatra | G10L 15/1815 |
| 2022/0261152 A1 | 8/2022 | Jude et al. | |
| 2022/0284090 A1* | 9/2022 | Taylor | G06F 21/316 |
| 2022/0293087 A1 | 9/2022 | Kumar | |
| 2022/0301548 A1* | 9/2022 | Wintrode | G10L 15/083 |
| 2022/0334719 A1 | 10/2022 | Thrane | |
| 2022/0335426 A1* | 10/2022 | Rapowitz | G06N 20/00 |
| 2022/0366131 A1 | 11/2022 | Ekron | |
| 2023/0020703 A1* | 1/2023 | Padinjaruveetil | H04L 9/3226 |
| 2023/0029634 A1 | 2/2023 | Teeple | |
| 2023/0058470 A1 | 2/2023 | Chandrashekar et al. | |
| 2023/0061725 A1 | 3/2023 | Khan | |
| 2023/0068099 A1 | 3/2023 | Abramenko et al. | |
| 2023/0137931 A1 | 5/2023 | Song | |
| 2023/0156085 A1 | 5/2023 | Yachiku | |
| 2023/0221911 A1 | 7/2023 | Bandameedipalli | |
| 2023/0252127 A1* | 8/2023 | Taylor | G06F 21/46 |
| | | | 726/6 |
| 2023/0254699 A1* | 8/2023 | Chaudhary | H04W 12/72 |
| | | | 455/411 |
| 2023/0319026 A1 | 10/2023 | Waltermann | |
| 2023/0333767 A1 | 10/2023 | MacGaffey | |
| 2023/0394127 A1* | 12/2023 | Tussy | G06Q 20/40145 |
| 2023/0409761 A1* | 12/2023 | Nagar | G10L 21/0272 |
| 2024/0112597 A1 | 4/2024 | Kim | |
| 2024/0127923 A1 | 4/2024 | Jaime | |
| 2024/0144935 A1* | 5/2024 | Martin | G10L 17/02 |
| 2024/0248592 A1 | 7/2024 | Zerhusen | |
| 2024/0340185 A1* | 10/2024 | Cameron | H04L 9/3247 |
| 2025/0013642 A1 | 1/2025 | Yang | |

FOREIGN PATENT DOCUMENTS

| | | |
|---|---|---|
| JP | 4808173 B2 | 11/2011 |
| JP | 2015-106406 A | 6/2015 |
| WO | 2023/220948 A1 | 11/2023 |

OTHER PUBLICATIONS

"MyChart," Web Page <https://www.mychart.org/> accessed on Oct. 30, 2022 (6 Pages).

(56) References Cited

OTHER PUBLICATIONS

Xu, Jie et al., "Federated learning for healthcare informatics," Journal of Healthcare Informatics Research 5 (2021): 1-19. (19 Pages).

Naz, Sadaf et al., "A comprehensive review of federated learning for COVID-19 detection," International Journal of Intelligent Systems 37.3 (2022): 2371-2392. (22 Pages).

Prasser, Fabian, et al., "Efficient and effective pruning strategies for health data de-identification," BMC medical informatics and decision making 16.1 (2016): 1-14. (14 Pages).

"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

"Speech Recognition," Web Accessibility Initiative. Web Page <https://www.w3.org/WAI/perspective-videos/voice/> accessed on Aug. 30, 2023 (6 Pages).

"Text Size," Web Accessibility Initiative. Web Page <https://www.w3.org/WAI/GL/low-vision-a11y-tf/wiki/Text_Size> accessed on Aug. 30, 2023 (5 Pages).

Mesko, Bertlan, "The Top 10 Health Chatbots," The Medical Futurist, Aug. 1, 2023, Web Page <https://medicalfuturist.com/top-10-health-chatbots/> accessed on Aug. 30, 2023 (11 Pages).

Longoni, Chiara et al., "AI Can Outperform Doctors. So Why Don't Patients Trust It?" Harvard Business Review, Oct. 30, 2019, Web Page <https://hbr.org/2019/10/ai-can-outperform-doctors-so-why-dont-patients-trust-it> accessed on Aug. 30, 2023 (7 Pages).

"Doctor Ai," DDXRX, Web Page <https://www.ddxrx.com/> accessed on Aug. 30, 2023 (7 Pages).

"Multi-Factor Authentication and Voice Biometrics," Voice Biometrics Group, Feb. 2021, Web Page <https://www.voicebiogroup.com/starting/multi-factor-authentication-and-voice-biometrics.html> accessed on Aug. 30, 2023 (6 Pages).

Wallace, Byron C et al. "Automatically annotating topics in transcripts of patient-provider interactions via machine learning." Medical decision making : an international journal of the Society for Medical Decision Making vol. 34,4 (2014): 503-12. doi:10.1177/0272989X13514777 (20 Pages).

"Medical Transcription Analysis with Machine Learning—Doctor/Patient Conversation Demo,"Amazon Web Services, Jun. 16, 2021, Web Page <https://www.youtube.com/watch?v=f5HVIALG5g4> accessed on Aug. 30, 2023 (2 Pages).

Baxendale, Simran et al., "Performing medical transcription analysis with Amazon Transcribe Medical and Amazon Comprehend Medical," Amazon Web Services, May 8, 2020, Web Page <https://aws.amazon.com/blogs/machine-learning/performing-medical-transcription-analysis-with-amazon-transcribe-medical-and-amazon-comprehend-medical/ > accessed on Aug. 30, 2023 (12 Pages).

Sullivan, Todd et al., "Speaker Identification and Geographical Region Prediction in Audio Reviews," Department of Computer Science, Stanford University, 2023 (4 Pages).

"Finding Local Destinations with Siri's Regionally Specific Language Models for Speech Recognition," Apple Machine Learning Research, Aug. 2018, Web Page <https://machinelearning.apple.com/research/regionally-specific-language-models> accessed on Aug. 30, 2023 (9 Pages).

Tyagi, Nemika et al., "Demystifying the Role of Natural Language Processing (NLP) in Smart City Applications: Background, Motivation, Recent Advances, and Future Research Directions." Wireless Personal Communications 130.2 (2023): 857-908. (52 Pages).

Alozie, Emeka, "The AI Surgeon's Assistant: How Generative AI is Revolutionizing the Operating Room," Apr. 20, 2023, Web Page <https://intuitivex.com/tpost/p7bhza9611-the-ai-surgeons-assistant-how-generative> accessed on Aug. 30, 2023 (9 Pages).

Gaitan, Michelle, "Researchers at UTSA use artificial intelligence to improve cancer treatment," University of Texas at San Antonio, Apr. 18, 2023, Web Page <https://www.utsa.edu/today/2023/04/story/researchers-use-artifical-intelligence-to-improve-cancer-treatments.html> accessed on Aug. 30, 2023 (4 Pages).

Bohr, Adam et al., "The rise of artificial intelligence in healthcare applications." Artificial Intelligence in Healthcare (2020): 25-60. doi:10.1016/B978-0-12-818438-7.00002-2 (37 Pages).

"Introducing Healthcare-Specific Large Language Models from John Snow Labs," KDnuggets, Apr. 28, 2023, Web Page <https://www.kdnuggets.com/2023/04/john-snow-introducing-healthcare-specific-large-language-models-john-snow-labs.html> accessed on Aug. 30, 2023 (7 Pages).

D. Fedasyuk and I. Lutsyk, "Tools for adaptation of a mobile application to the needs of users with cognitive impairments," 2021 IEEE 16th International Conference on Computer Sciences and Information Technologies (CSIT), Lviv, Ukraine, 2021, pp. 321-324, doi: 10.1109/CSIT52700.2021.9648702. (Year: 2021).

Balaskas, Georgios, et al., "An end-to-end system for transcription, translation, and summarization to support the co-creation process. A Health CASCADE Study", ACM PETRA '23, published Aug. 10, 2023, pp. 625-631. (Year: 2023) (7 Pages).

\* cited by examiner

MULTIFACTOR AUTHENTICATION BASED ON USER EXPERIENCES

FIELD

Embodiments disclosed herein relate generally to data security. More particularly, embodiments disclosed herein relate to systems and methods to manage access to sensitive data.

BACKGROUND

Computing devices may provide computer-implemented services. The computer-implemented services may be used by users of the computing devices and/or devices operably connected to the computing devices. The computing devices may utilize sensitive data when providing the computer-implemented services. Data security measures may be implemented in order to protect the sensitive data from unauthorized access while providing the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
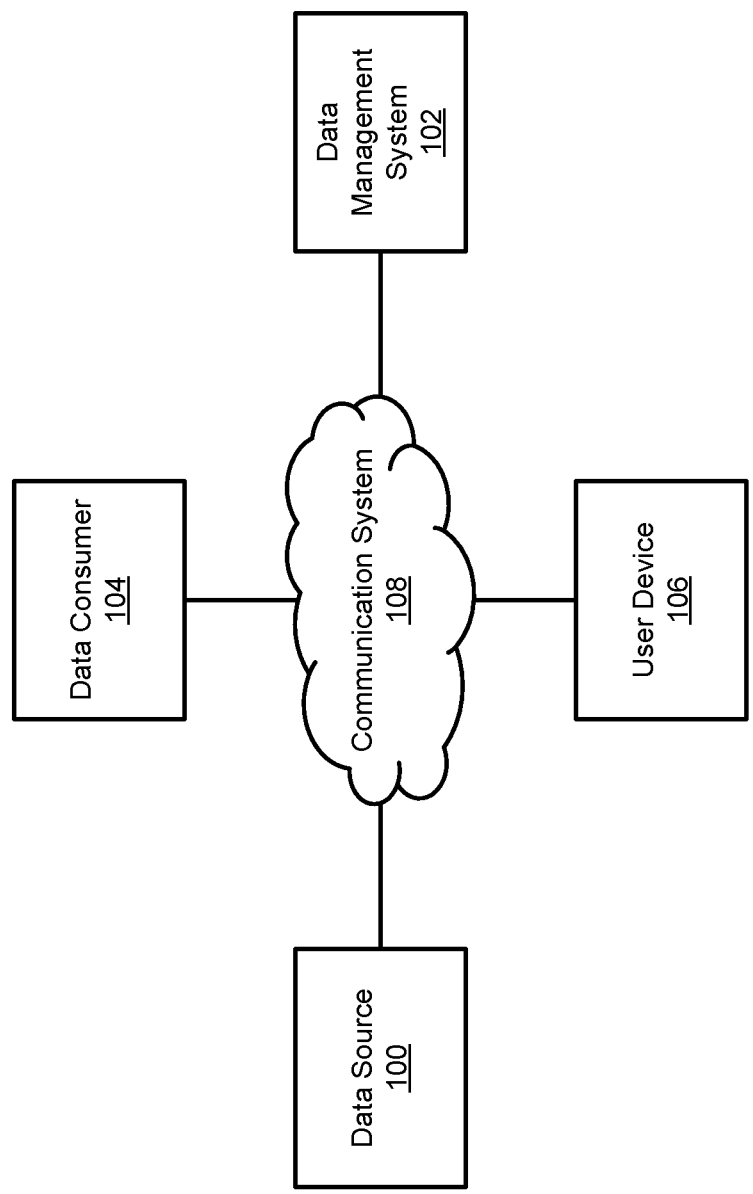
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing requests for functionalities of a data repository. The data repository may facilitate computer-implemented services, such as data storage and/or data access services. For example, the data repository may be used to store sensitive data such as medical data, to which authorized entities may request access. However, for various reasons, unauthorized entities (e.g., malicious parties) may attempt to gain access to the sensitive data. The security of data stored in the data repository may depend on a security framework (e.g., access control measures) implemented around the functionalities of the data storage system (e.g., the data repository and/or a data management system manages the data repository).

The data management system may employ access control measures such as multi-factor authentication (MFA) in order to verify the identity of users that request permission for functionality of (e.g., access to sensitive data stored in) the data repository. MFA may include two or more forms of authentication (e.g., knowledge-based forms, possession-based forms, etc.). For example, knowledge-based forms such as user authentication (e.g., username and password combinations) and/or possession-based forms such as device authentication (e.g., the registration of devices and/or verification of registered devices) may be implemented to prevent unauthorized access to functionality of the data repository (e.g., access to sensitive data).

However, an unauthorized user (e.g., a malicious party) may gain access to the credentials and/or devices of an authorized user, which may result in the unauthorized user being granted permissions for a request for functionality of the data repository (e.g., access to personal data of the authorized user). In addition, possession-based forms of MFA methods may remain vulnerable to attacks by malicious parties (e.g., phishing attacks, man-in-the-middle attacks, etc.). For example, MFA-related data transmissions (e.g., verification codes sent to a device in the possession of the user), which may allow the malicious party to gain access to portions of the sensitive data stored in the data repository.

To increase the security of access to functionality of the data repository, additional authentication factors such as security questions may be implemented. Therefore, if a first credential of an authorized user (e.g., username and/or password) is compromised, then the requestor (e.g., of data repository functionality) must be authenticated via an additional layer of security (e.g., responses to security questions). However, although the security questions and the (correct) responses may be pre-selected by the authorized user, the security questions may be generic (e.g., not personalized to the authorized user), which may increase the likelihood of the authorized user forgetting the correct responses and/or being refused access to the data repository functionality. The security questions may also be static (e.g., never updated or not updated for long periods of time), which may increase the likelihood of an unauthorized user (e.g., malicious party) predicting the correct responses and/or gaining unauthorized access to functionality of the repository.

Therefore, to improve the security of and/or ease-of-access (e.g., for authorized users) to the functionalities of the data repository, the security questions and corresponding correct responses (e.g., implemented as a portion of the security framework) may be based on personal experiences of the authorized user. For example, personal experiences may include memorable experiences based on personal and/or medical data of the authorized user. In addition, the security questions (and corresponding correct responses) may be dynamic (e.g., continuously updated as new medical data is collected).

By doing so, embodiments disclosed herein may provide a system for managing access to data repository functionality using forms of MFA that are based on experiences of authorized users. The experiences may be identified from data stored in the data repository. For example, medical data regarding the authorized user may be collected, classified (e.g., by topic), and/or ranked by topic relevance (e.g., using topic rankings). The more relevant topics may be used to identify details regarding relevant experiences of the user, on which the security questions and/or responses may be based. Thus, the implemented MFA may include dynamic symmetric secrets (e.g., security questions and responses) that are personal, relevant, and/or unique to an authorized user, and that are updated over time (e.g., as new medical data regarding the authorized user is collected). As a result, the responses to the security questions may be easy to remember for the authorized user and/or difficult to predict for unauthorized users, thereby improving the data security measures implemented around requests (e.g., access requests) for functionality of the data repository.

In an embodiment, a computer-implemented method for managing requests for functionalities of a data repository is provided. The method may include obtaining a request of the requests from a requestor, the request being for a functionality of the functionalities of the data repository.

Based on the request, the method may include: obtaining a security question using topic classifications for a portion of data stored in the data repository and topic rankings for the topic classifications; obtaining a response to the security question from the requestor; and, making a determination regarding whether to approve the request based on the response to the security question.

In a first instance of the determination where the request is approved, the method may include granting the requestor permission for at least the functionality. In a second instance of the determination where the request is not approved, the method may include denying the requestor permission for the functionality.

The requestor may be a first individual for which the portion of the data is stored.

Obtaining the security question may include: obtaining a rank ordering of the portion of the data based on the topic rankings; selecting a highest ranked portion of the portion of the data based on the rank ordering; and, formulating the security question based on at least the highest ranked portion of the data.

The security question may be formulated based on details of an experience of the first individual, the experience occurring prior to obtaining the request, and the details of the experience being documented in the portion of the data.

The experience may be one experience from a group of experiences consisting of: participation in a medical procedure; participation in an interaction between the first individual and a medical professional; and, participation in a medical test.

In an instance of the obtaining the security question where the experience is participation in the medical procedure, the details may include a location where the medical procedure was performed, a reason for performance of the medical procedure, and a time period in which the medical procedure was performed.

In an instance of the obtaining the security question where the experience is participation in the interaction, the details may include a location where the interaction took place, a reason for the interaction occurring, and a time period in which the interaction took place.

In an instance of the obtaining the security question where the experience is participation in the medical test, the details may include a location where the medical test was performed, a reason for performance of the medical test, and a time period in which the medical test was performed.

The topic classifications may be based at least in part on an audio transcript, the audio transcript being based on an audio file, the audio file including audio data based on at least one conversation between two people.

The topic classifications may include an enumeration of each unique topic of topics discussed during the at least one conversation between the two people captured in the audio transcript, and the two people may include a first individual for which the data is stored, and a second individual which provides at least one service to the first individual.

The topic rankings may specify a rank ordering of the topic classifications.

The method may further include, prior to obtaining the request: obtaining an audio transcript from a data source; performing a transcription process, using the audio transcript, to obtain a text transcript; performing an analysis of the text transcript; and, identifying, based on the analysis of the text transcript, the topic classifications, and the topic rankings for the topic classifications.

The method may further include, prior to obtaining the request, obtaining unclassified data from the data source, and performing a topic identification process using the unclassified data and the topic classifications to identify a topic classification of the topic classifications for the unclassified data.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other type of service that may be implemented with a computing device.

The system may include data management system 102. Data management system 102 may provide all, or a portion of the computer-implemented services. As part of the provided computer-implemented services, data may be stored in data management system 102 (e.g., in a data repository that is part of and/or managed by data management system 102). The data stored in the data repository may include data usable by (i) a first individual for whom the data is stored, (ii) secondary individuals that may assist the first individual, and/or (iii) other individuals for other types of use. For example, the data may include medical information for the first individual, and the data may be usable by secondary individuals such as medical providers to diagnose and/or treat the first individual for various health conditions.

The data stored in and/or by data management system 102 may be collected from data source 100. While illustrated with respect to a single data source, the system of FIG. 1 may include any number of data sources through which data management system 102 may obtain data. Data source 100 may include hardware and/or software components configured to obtain data, store data, provide data to other entities, and/or to perform any other task to facilitate performance of the computer-implemented services.

For example, medical information for an individual may be obtained from a medical provider system (e.g., data source 100) for use by the individual and/or other individuals (via associated devices). The data collected from data source 100 may include any quantity, size, and/or type of data. The data may include, for example, an audio recording (e.g., an audio file) of a conversation between an individual and a medical provider, digitized results of medical tests, medical images, etc.

The data stored in the data repository may include aggregate data (e.g., data aggregated from various data sources) and/or may be accessed for a variety of purposes. For example, in the medical context, the data (e.g., aggregated medical data) may be accessed for diagnostic purposes (e.g., for use by a primary care physician), verification purposes (e.g., for use by other physicians providing second medical opinions), research purposes (e.g., for use in medical studies performed by third parties), etc. While described with respect to medical services, it will be appreciated that the data may be managed by data management system 102 for other purposes and/or with respect to other contexts. In other words, the stored data may be relevant for other types of services, uses, etc., without departing from embodiments disclosed herein.

As part of the computer-implemented services provided by the system of FIG. 1, Data management system 102 may obtain and/or manage requests for functionalities of the data repository. The requests for functionalities may be obtained from a device (e.g., user device 106) and/or initiated by a user of the device. For example, a request for functionality may include (i) access to data stored in the data repository, (ii) access to metadata of the data stored in the data repository, (iii) management of the data stored in the data repository (e.g., the removal, addition and/or modification of data and/or its associated metadata), and/or (iv) access to other functionality of the data repository.

As previously discussed, sensitive data (e.g., personal data such as medical data regarding one or more individuals may be protected from unauthorized access using one or more forms of user and/or device authentication. For example, a request for access to portions of the data (e.g., portions of sensitive data) may only be approved when the requesting user is authenticated as an authorized user of the portion of the data, which may be verified based on various security credentials (e.g., passwords, personal identification numbers (PINs), security codes sent to registered devices of the authorized user, etc.). However, some forms of authentication may fail if one or more security credentials are compromised (e.g., discovered and/or intercepted by unauthorized users) and/or are inaccessible to (e.g., lost and/or forgotten by) the authorized user.

In general, embodiments disclosed herein may provide methods, systems, and/or devices for managing requests for functionalities (e.g., data access requests) of a data repository that may store sensitive data. To manage the requests, data management system 102 may implement dynamic security questions based on relevant experiences of authorized users (e.g., as a portion of MFA).

For example, data management system 102 may manage requests for functionality of the data repository by (i) obtaining the requests (e.g., initiated by requestors), (ii) obtaining and/or generating security questions and corresponding correct responses based on the requests (e.g., using data regarding the requestor that is stored in a data repository of data management system 102), (iii) obtaining responses (e.g., from the requestors) to the security questions in order to authenticate the requestors, (iv) based on the result of the authentication, grant or deny the requestors permission for the functionality, and/or (v) perform other types of actions related to the authentication of the requestors and/or management of the requests.

Data management system 102 may select portions of data (e.g., data regarding an individual requesting functionality of the data repository) for performance of one or more management actions (e.g., generation of the security questions and the corresponding correct responses) on the basis of relevancy of the portions of the data. For example, some portions of the data stored in the data management system may be associated with topics (e.g., experiences of the individual) that are more relevant or significant to the individual than other portions of the data stored in the data management system. The portions of data associated with topics relevant to the individual may include memorable experiences of the individual, and therefore may be selected for use in performing management actions such as generating the security questions and the corresponding correct responses. Therefore, data management system 102 may discriminate between different portions of data based on the relevancy of the data.

In order to distinguish more relevant portions of the data from less relevant portions of the data, data management system 102 may analyze collected data (e.g., data collected from data source 100), audio recordings of interactions between the individual and other individuals that may provide to the individual, and/or other types of data that may include content relevant for discerning between topics that are relevant (e.g., memorable) to the individual for which the data is stored and topics that are not relevant (e.g., not memorably significant) to the individual.

For example, data management system 102 may analyze an audio recording of a conversation between an individual and a medical provider to identify medical conditions impacting the individual. Based on this identification, data management system 102 may establish topics that are relevant to the individual. Data management system 102 may classify portions of data stored for the individual (e.g., in data management system 102) based on the established topics, and/or rank the portions of data based on their topic classifications. In other words, data management system 102 may identify topic classifications (e.g., for the portions of the data stored for the individual) and/or obtain topic rankings for the topic classifications in order to distinguish relevant portions of the data stored for the individual from less relevant portions of the data.

As new information regarding the topics becomes available (e.g., as new data is collected from various data sources such as data source 100), data management may identify new topics, update topic classifications, and/or modify the topic rankings for the topic classifications. For example, a new data is collected, new topics may be identified that are more relevant than previously identified topics; therefore, the topic rankings of the previously identified topics may be modified (e.g., reduced) to accommodate the new, more relevant topics. Consequently, the topics (e.g., and related experiences) on which the security questions may be based may change over time, resulting in dynamic security questions that are relevant (e.g., memorable) to the individual.

By using dynamic, relevant, and personalized security questions as part of MFA, embodiments disclosed herein may provide an improved security framework implemented around the functionality of the data repository. The improved security framework may (i) decrease the likelihood of interruptions in the computer-implemented services facilitated by the data repository, and/or (ii) decrease the likelihood of the data being accessed by unauthorized parties (e.g., malicious parties that may use the data for nefarious purposes). The disclosed embodiments may do so in an automated and/or semiautomated fashion thereby reducing cognitive burden on an individual that may perform one or more portions of the methods disclosed herein.

To provide the above noted functionality, the system of FIG. 1 may include data source 100, data management system 102 (e.g., including a data repository (not shown)), data consumer 104, user device 106, and communication system 108. Each of these components is discussed below.

Figure 2A:
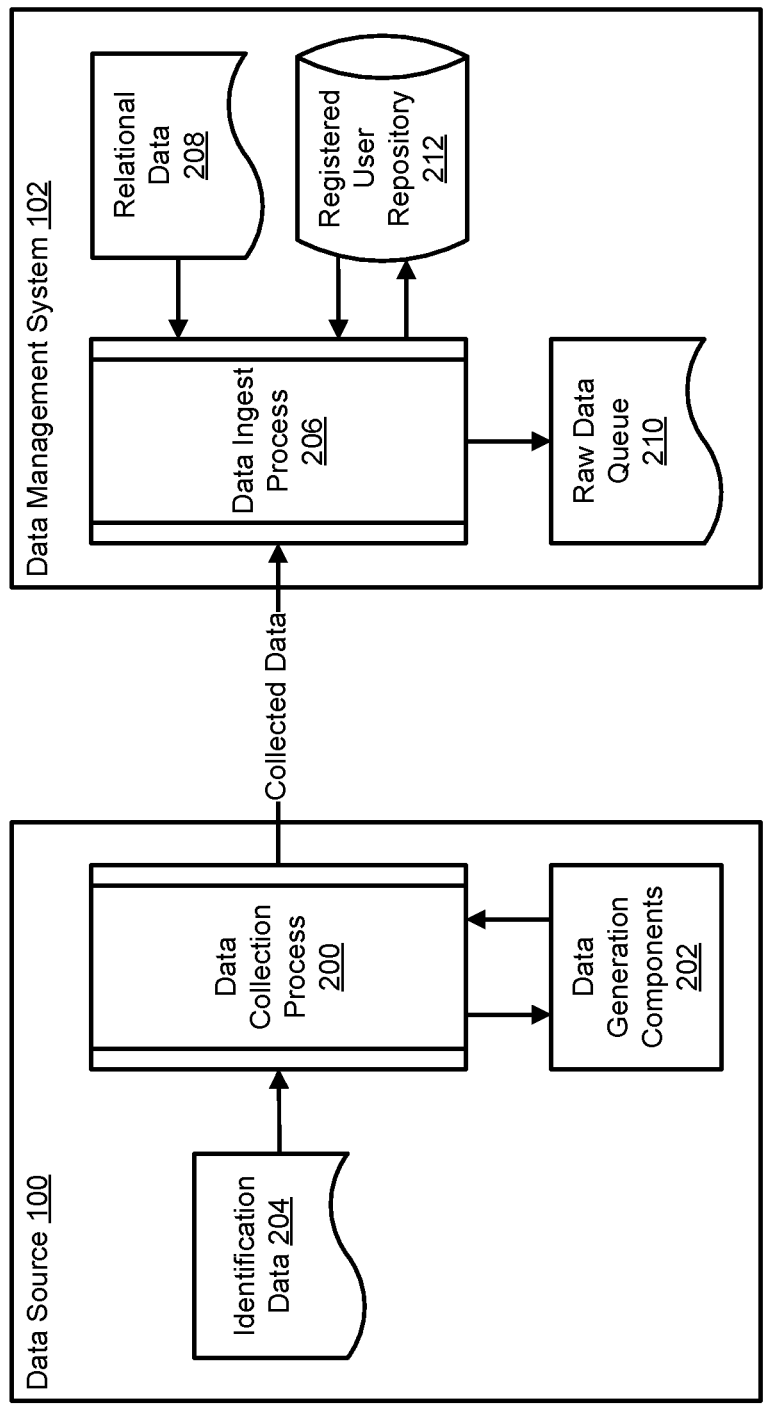
FIG. 2A shows a data flow diagram illustrating a process for collecting data in accordance with an embodiment.

Data source 100 may (i) facilitate collection and transmission of data (e.g., regarding and/or relating to an individual) to data management system 102, (ii) provide information identifying the individual or entity sourcing the data to data management system 102, and/or (iii) otherwise facilitate collection of data by data management system 102. Data source 100 may include (i) a system (e.g., operated by a medical provider) that may collect, store, and/or provide access to data for an individual (e.g., a patient), (ii) a personal device that collects information about the individual (e.g., mobile phone, smart watch, etc.), and/or (iii) other types of device that may collect data. While described with respect to a medical services, it will be appreciated that data source 100 may provide data usable for other purposes without departing from embodiments disclosed herein. Refer to FIG. 2A for additional details regarding obtaining data using data source 100.

Data source 100 may be managed by (i) an individual (e.g., a patient) for which the data is being collected, (ii) other individuals that may provide a service for the individual (e.g., medical staff), and/or (iii) entities that may provide services for the individual. For example, data source 100 may be implemented using a professional medical device and/or another device operated by a medical provider.

Figure 2B:
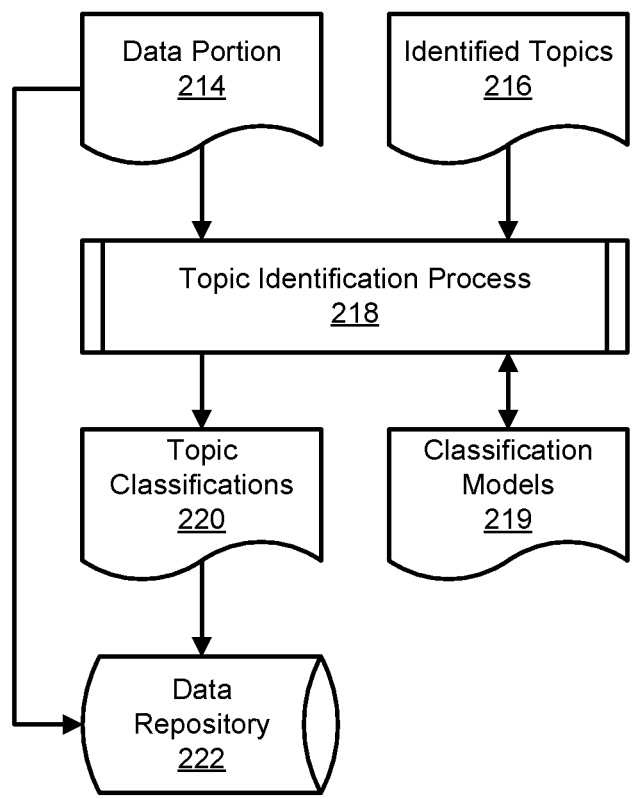
FIG. 2B shows a data flow diagram illustrating a process for classifying data in accordance with an embodiment.
Figure 2C:
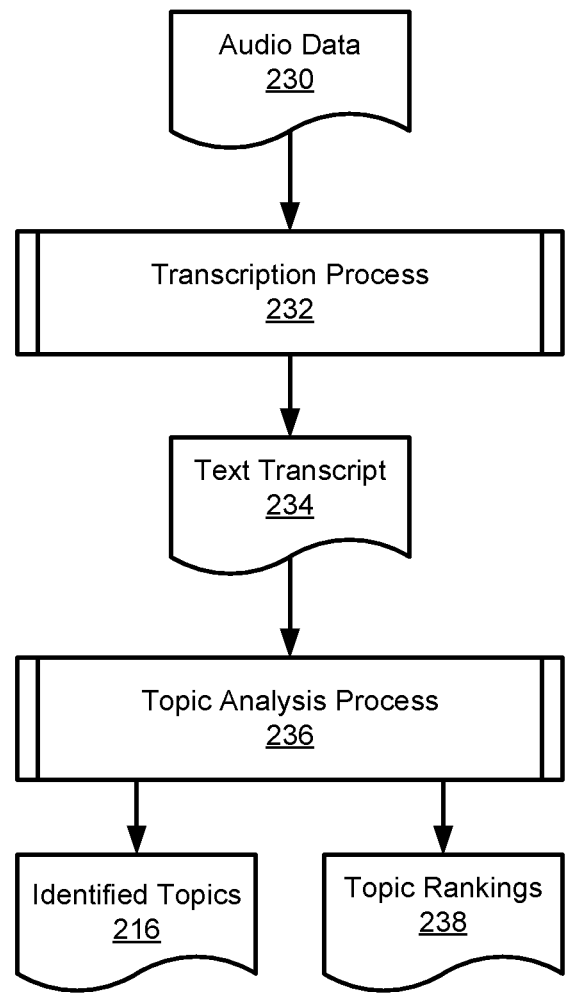
FIG. 2C shows a data flow diagram illustrating a process for identifying topics in accordance with an embodiment.

To manage the security of the collected data, data management system 102 may (i) obtain data from data source 100, (ii) manipulate, enrich, analyze, and/or otherwise prepare the data for storage in a data repository, (iii) for audio data, perform a transcription process to obtain a text transcript of the audio data, (iv) perform an analysis of the text transcript of the data, (v) based on the analysis of the text transcript, identify topic classifications and topic rankings for the topic classifications, (vi) when new data is obtained, perform a topic identification process to identify a (new) topic classification for the new data (and a topic ranking for the topic classification), (vii) based on the topic classification and its topic ranking, obtain security questions and corresponding correct responses (e.g., for use in authenticating a requestor of functionality of the data repository), and/or (viii) perform MFA to authenticate the requestor (e.g., based, at least in part on the security questions) to manage the requestor's permissions for functionality of the data repository. Refer to FIGS. 2B-2C for additional details regarding topic identification and topic ranking.

Figure 2D:
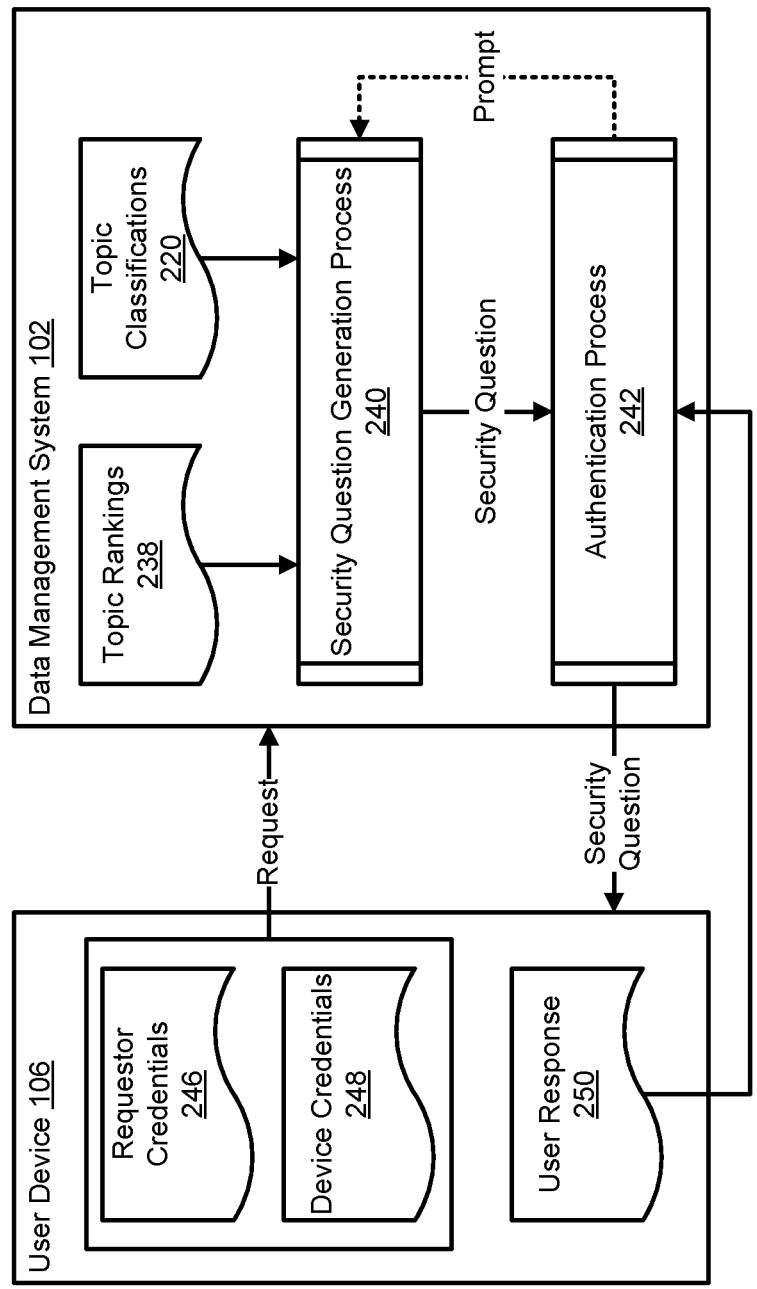
FIG. 2D shows a data flow diagram illustrating a process for managing requests for functionalities of a data repository in accordance with an embodiment.

To manage requests for functionality of the data repository, data management system 102 may perform any number of management actions, which may include (i) presenting a security question to a requestor that has initiated a request for data repository functionality, (ii) obtaining a response to the security question in order to determine whether to approve the request, (iii) based on the determination, granting or denying the requestor permission for the functionality, and/or (iv) performing other types of actions regarding the request (e.g., flagging a device, a user account, etc.) Similarly, data management system 102 may also provide access to stored data (e.g., to the individual for which the data is being managed and/or to data consumer 104). Refer to FIG. 2D for additional details regarding the management of requests for data repository functionalities.

Data consumer 104 may (i) obtain limited access to selected portions of data, metadata, etc., stored in data management system 102, (ii) submit requests for access to data stored in data management system 102 (e.g., by a third party and/or other individual), (iii) provide information identifying the individual and/or entity requesting access to the data (or other types of information upon which decisions to grant access may be based, and/or (iv) once a request for access is approved (e.g., by user device 106), obtain access to data stored in data management system 102 (e.g., data for which permissions for access have been granted based on the approved request).

User device 106 may facilitate (i) access and control over data stored in data management system 102 (e.g., by an individual for whom the data is stored), (ii) designation of portions of data for use by other individuals (e.g., data consumer 104), and/or (iii) performance of other management operations. User device 106 may be registered with data management system 102. For example, data management system 102 may confirm the identity of user device 106 based on a registration of the device, and the registration may indicate that user device 106 is being operated by a particular user.

Figure 3A:
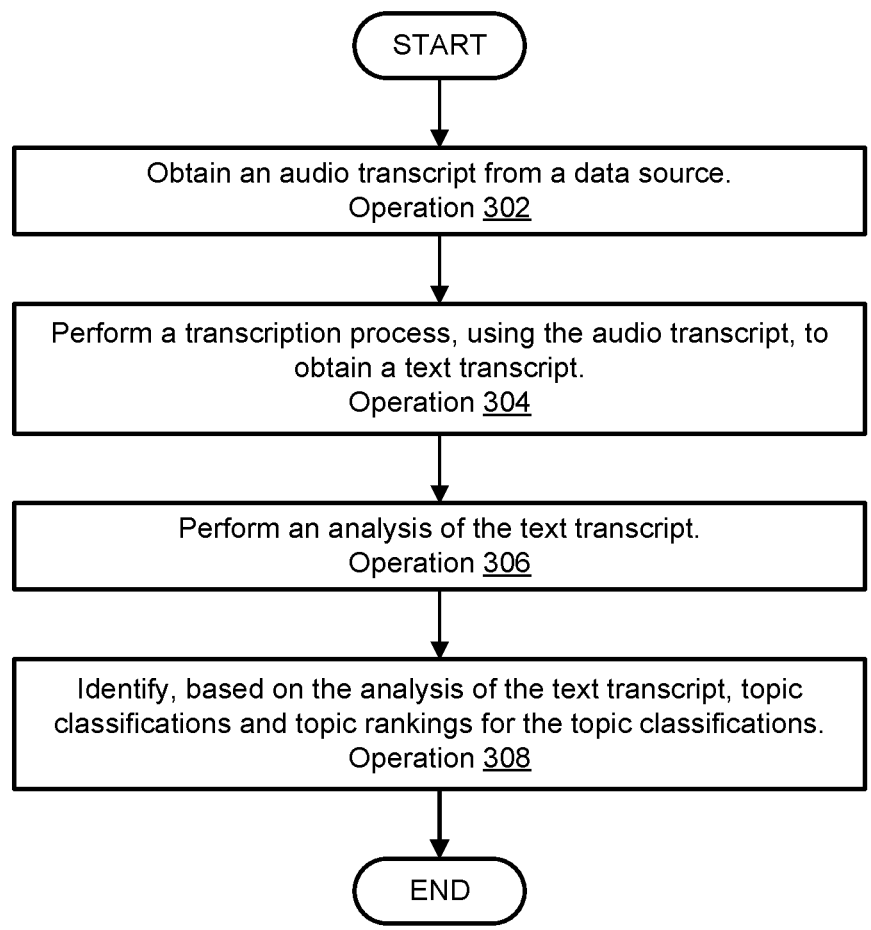
FIG. 3A shows a flow diagram illustration a method for obtaining a classification and rankings for data in accordance with an embodiment.
Figure 3B:
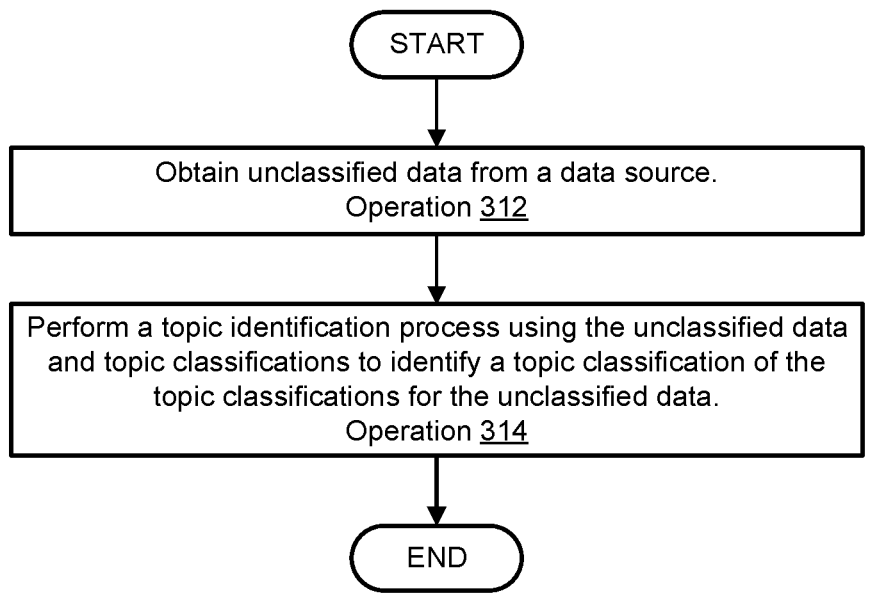
FIG. 3B shows a flow diagram illustration a method of classifying data for topic relevancy in accordance with an embodiment.
Figure 3C:
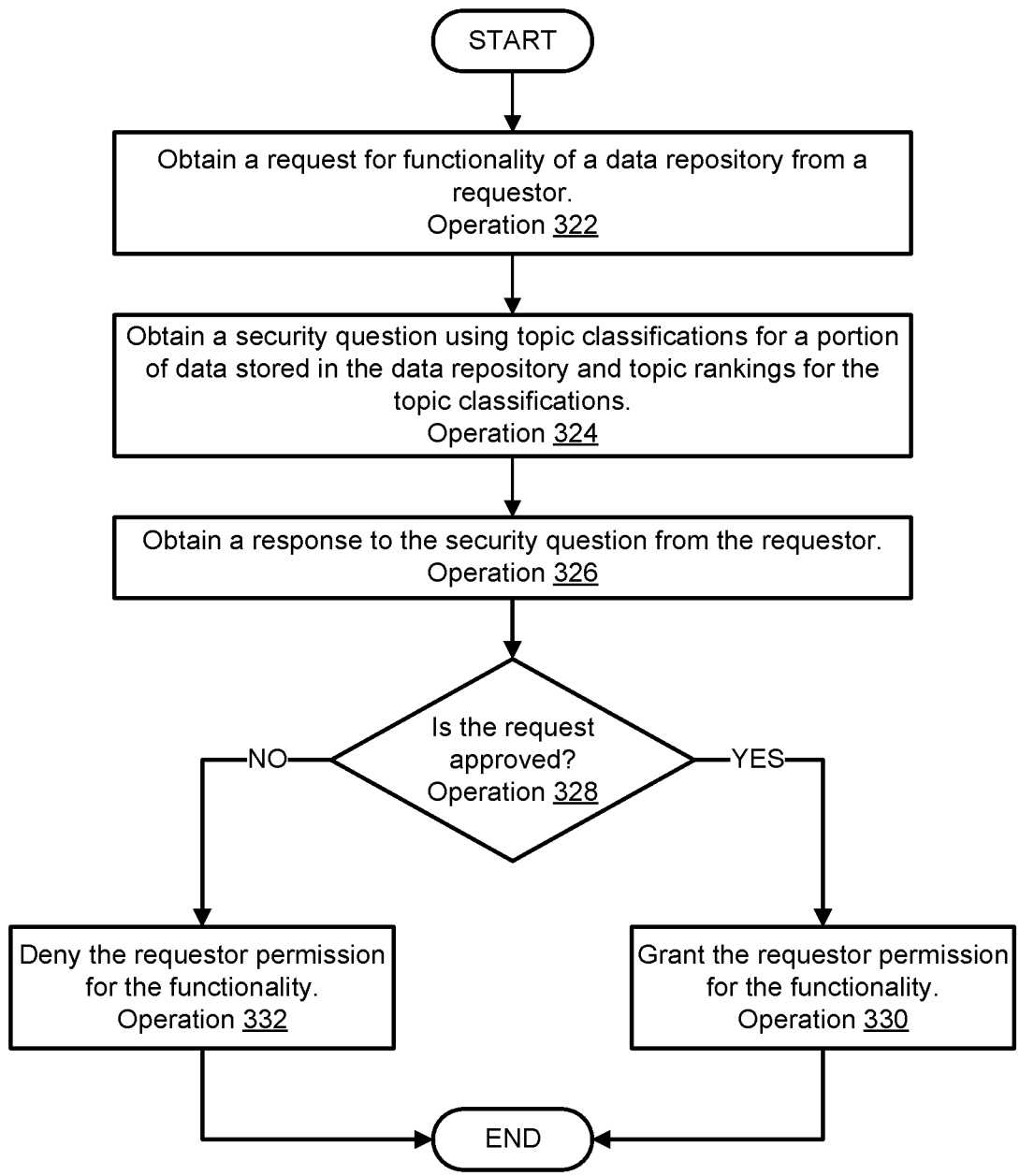
FIG. 3C shows a flow diagram illustrating a method of managing requests for functionalities of a data repository in accordance with an embodiment.

When providing their functionality, any of data source 100, data management system 102, data consumer 104, and/or user device 106 may perform all, or a portion of the methods shown in FIGS. 3A-3C.

Any of (and/or components thereof) data source 100, data management system 102, data consumer 104, and/or user device 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to FIG. 4.

In an embodiment, one or more of data source 100, data management system 102, data consumer 104, and/or user device 106 are implemented using an internet of things (IoT) device, which may include a computing device. The IoT device may operate in accordance with a communication model and/or management model known to data source 100, data management system 102, data consumer 104, and/or user device 106), and/or other devices.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by a system over time in accordance with an embodiment are shown in FIGS. 2A-2D. The processes shown in FIGS. 2A-2D may be performed by any entity shown in the system of FIG. 1 (e.g., a data manager similar to data management system 102, a downstream consumer similar to data consumer 104, etc.) and/or another entity without departing from embodiments disclosed herein. In FIGS. 2A-2D, a first set of shapes (e.g., 204, 208) is used to represent data structures, a second set of shapes (e.g., 200, 206) is used to represent processes performed using data, and a third set of shapes (e.g., 212, 222) is used to represent large scale data structures such as databases.

Turning to FIG. 2A, a first data flow diagram in accordance with an embodiment is shown. The first data flow diagram may illustrate a process for collecting data. Data flows, data processing, and/or other operations illustrated by the first data flow diagram may be performed when data is obtained from a data source In FIG. 2A, example flows between data source 100 and data management system 102 are shown. It will be appreciated that similar data flows with respect to any devices (e.g., devices that may collect and transmit data to data management system 102 such as user device 106) and data management system 102 may be present.

To provide computer-implemented services, data management system 102 may obtain, store, and/or otherwise manage data for an individual. Data management system 102 may (i) obtain data from data source 100, and (ii) store some or all of the collected data for future use. To obtain the data, data management system 102 and data sources 100 may cooperate with one another for data collection purposes.

To cooperate with data management system 102 for data collection purposes, data source 100 may perform data collection process 200. During data collection process 200, data may be (i) collected using data generation components 202, and (ii) provided all or a portion of the collected data (and/or derived data that is based at least in part on the collected data) to data management system 102.

Data generation components 202 may include software components and/or hardware components to collect data. For example, data generation components 202 may include sensors, generative components, and/or display components of data source 100. The display components may be used to display prompts to a user of data source 100 (e.g., to instruct a user how to participate in data collection processes). The generative components may be used to generate various stimulations (e.g., optical, audio, etc.) for the user (e.g., so that data may be collected). The sensors may be used to obtain information regarding the user and the impact of the stimulations on the user.

Once collected, the data may be prepared for transmission to data management system. To prepare the collected data for transmission, the data may be enriched with additional information by adding metadata. The metadata may include, for example, (i) information regarding how the data was collected, (ii) information regarding for which entity the data was collected, such as a user for which data management system 102 manages data, (iii) collection time, and/or other information that may enhance the collected data.

To add the metadata, data source 100 may store information regarding the user. For example, data source may store identification data 204. Identification data 204 may include information regarding the identity of the individual for which the collected data is regarding/relating to. For example, identifying information such as the individual's name, date of birth, and/or any other identifying information for the individual for which the data is regarding.

Identification data 204 may also include information regarding the identity of the user and/or entity operating data source 100. For example, identifying information such as the user's and/or entity's name, IP address, and/or any other information useful to identify the operator and/or manager of data source 100.

Once enriched, the collected data and corresponding metadata may be provided to data management system 102.

To cooperate with data source 100 for data collection purposes, data management system 102 may perform data ingest process 206. During data ingest process 206, the collected data obtained from data source 100 may be (i) classified with respect to which user the collected data is associated, (ii) managed in accordance with user-based access controls, and (iii) queued in raw data queue 210 for additional processing. Refer to FIGS. 2B-2D for additional details regarding the additional processing that may be performed on collected data.

To classify the data with respect to a user, the metadata may specify the user for which the data was collected. The user specified by the metadata may be checked against users listed in registered user repository 212. Registered user repository 212 may include information regarding users that received data management services from data management system 102. Thus, when collected data is obtained, it may be verified as being relevant to users using registered user repository 212 (if not relevant, it may be discarded).

To manage the collected data in accordance with access controls, access to the data may be at least partially restricted. The restrictions for access to the collected data may be specified by relational data 208. Relational data 208 may specify restrictions for access to data managed by data management system 102 on behalf of different users. For example, the users may specify limits on the ability of other entities to access data managed by data management system 102 on behalf of the users.

For example, relational data 208 may specify whether and to what extent a data consumer (e.g., data consumer 104) may access the data stored by data management system 102 on behalf of a user. The access controls may be granular, thereby allowing a user to control which data consumers are able to access different portions of data. The access controls for a user may be established on a topic-by-topic basis. Thus, access to data for a given consumer may be given on a topic basis thereby allowing a user to provide a data consumer with access to all, or a portion, of the data managed by data management system that is related to one or more topics. Refer to FIGS. 2B-2C for additional information regarding topics.

To prepare the collected data for additional processing, the collected data may be queued in raw data queue 210. Raw data queue 210 may be implemented as a first in first out queue, or other type of queue. Raw data queue 210 may buffer data until it is processed and stored for long term retention.

Turning to FIG. 2B, a second data flow diagram in accordance with an embodiment is shown. The second data flow diagram may illustrate a process for classifying data. Data flows, data processing, and/or other operations illustrated by the second data flow diagram may be performed when data is classified with respect to its relevancy to different topics.

As discussed above, the system may authenticate a user (e.g., an individual that has initiated a request for access to data stored on behalf of the individual, in a data repository) based on the relevancy of the data to the individual. To discriminate more relevant data from less relevant data, data management system 102 may classify the relevancy of data with respect to topics that are relevant to the user (e.g., the individual).

To classify the collected data and/or stored data, topic identification process 218 may be performed. During topic identification process 218, portions of data (e.g., data portion 214) may be obtained from the raw data queue and/or data repository 222 (e.g., if re-classifying data). The portions of data may reflect discrete portions such as files.

Once obtained, data portion 214 may be classified with respect to certain topics that have been identified as being relevant to an individual. The topics that are relevant to the individual may be specified by identified topics 216. Refer to FIG. 2C for additional details regarding identifying topics that are relevant to different individuals.

To classify data portion 214 with respect to identified topics 216, various classification models 219 may be used. The classification models 219 may be implemented using, for example, inference models (e.g., decision trees, machine-learning models, rules-based systems, etc.). Classification models 219 may include any number of such inference models.

In an embodiment, at least some of the inference models are implemented by training a neural network to perform classification. The neural network may be trained using supervised learning, self-supervised learning, semi-supervised learning, and/or unsupervised learning. For example, with supervised learning, some number of instances of data may be hand-labeled by a subject matter expert or other person with respect to the topics (may be any number of topics, may include more topics than identified topics 216) for which the data is relevant to obtain training data. Once obtained, the training data may be used to train the neural network (e.g., to set the weights of neurons and/or other features of the neural network).

In an embodiment, classification models 219 includes different models that are adapted to classify different types of data. For example, different inference models of classification models 219 may be adapted to handle images, text documents, tabular datasets, and/or other types of data.

In an embodiment, classification models 219 includes multiple different models that may be used to classify data portion 214. For example, data portion 214 may include different types of data. The inference models from classification models 219 may be used to identify topics for the different types of data, thereby identifying multiple topics to which data portion 214 may be relevant.

In an embodiment, at least one inference model from classification models 219 is trained to identify more than one topic for ingest data. For example, the inference model may specify a range of different topics to which data portion 214 is relevant. The range of different topics may include a variety of topics that may be relevant to the individual and/or user for which the data is being stored in data management system 102.

To obtain topic classifications 220 for data portion 214, data portion 214 may be ingested by any of the models of classification models 219. The models may, as output, indicate any number of topics to which data portion 214 is relevant. The topics output by classification models 219 may be filtered against identified topics 216 to identify topic classifications 220. For example, if classification models 219 indicate that data portion 214 is relevant for the topics of "head", "neck", "balloons", and "tattoo", but identified topics 216 only specify the topics of "head" and "neck", then the topics "balloons" and "tattoo" may be filtered out resulting in topic classifications 220 only including the topics "head" and "neck".

Once topic classifications 220 are obtained, data portion 214 and topic classifications may be stored in data repository 222 for future use. Topic classifications 220 and data portion 214 may be associated with each other in data repository 222. Topic classifications 220 may be used, for example, to generate security questions for authentication of individuals requesting functionality of a data repository (e.g., that stores personal data of the individual), by facilitating the identification of the topics and/or experiences for which data portion 214 is relevant.

However, as discussed above, to identify topic classifications 220, identified topics 216 (e.g., that are relevant to a user, purpose, etc.) may need to be available.

Turning to FIG. 2C, a third data flow diagram in accordance with an embodiment is shown. The third flow diagram may illustrate a process for identifying topics. Data flows, data processing, and/or other operations illustrated by the third data flow diagram may be performed to identify topics relevant to a user, purpose, and/or another basis.

To obtain identified topics 216, data including clues and/or other information usable to identify topics that are relevant may be collected. For example, audio recordings of interactions (e.g., conversations) between an individual (e.g., a user of the data management system) and other individuals that provide services (e.g., a purpose for the data) to the individual may be obtained. The resulting audio data 230, and/or other types of data that may include content relevant to discern topics relevant to the individual for which the data is being collected and stored, may be used to identify topics relevant to the individual.

For example, audio data 230 may include an audio recording of a conversation between a patient and a medical provider in which the two people discuss diagnosis, treatment, etc. for a particular type of medical condition such as diabetes. The conversation may be analyzed to identify topics (e.g., medical tests, medical conditions, portions of the patient's anatomy affected by the medical conditions, etc.) that are relevant to the patient.

In order to analyze audio data 230, transcription process 232 may be performed. During transcription process 232, audio data 230 may be transcribed to obtain text transcript 234. Transcription process 232 may be performed using an inference model (not shown), artificial intelligence model (AI model), natural language processing, and/or automated transcription modalities. For example, audio data 230 may be ingested by an inference model through which audio data 230 is analyzed and transcribed into a text format (e.g., text transcript 234).

Once text transcript 234 is obtained, topic analysis process 236 may be performed in order to obtain identified topics 216 and topic rankings 238. Identified topics 216 may, as noted above, indicate topics that are relevant to a user of the data management system, and topic rankings 238 may indicate a rank order of the topics indicated by the identified topics 216. The rank order may be with respect to relevancy of the topics to the user.

During topic analysis process 236, text transcript 234 may be analyzed to (i) identify topics relevant to a user, and/or (ii) identify a relative importance of each of the topics to the user.

To identify topics relevant to the user, text transcript 234 may be analyzed via (i) automated textual analysis to identify frequency/number of occurrences of difference utterances (e.g., words, phrases, etc.) made during the conversation captured in audio data 230, (ii) inferencing using inference models, (iii) large language model based natural language processing, and/or other text analysis modalities. The resulting output of any of these analyzation techniques may include a list of (i) topics that arose during the conversation captured in audio data 230, (ii) frequencies/counts of the topics, (iii) levels of emphasis on the different topics made by the different participants in the conversation, (iv) participants in the conversation that brought up the topics during the conversation, (v) duration of time during the conversation each topic was the topic of the conversation, (vi) opinion polarity (e.g., positive, neutral, negative, etc.) of each topic identified in the data, and/or other information regarding the topics during the conversation.

Identified topics 216 may be established based on any of the aforementioned information obtained via analysis of text transcript 234. For example, identified topics 216 may include (i) all topics that met a minimum threshold of interest (e.g., brought up above a threshold number of times/met a duration of time requirement as the topic of conversation) during the conversation captured by audio data 230, (ii) a prescribed number of the topics that were of the highest interest, etc.

Topic rankings 238 may be established based on the level of interest in each of identified topics 216 identified based on the conversation captured by audio data 230. For example, topics rankings 238 may rank identified topics 216 based on the number of times, frequency of utterance, and/or other quantification regarding interest in each of identified topics 216.

For example, an AI model may analyze text data (e.g., text transcript 234) regarding medical diagnosis, treatment, etc., for an individual and identify features (e.g., certain group of text or words) related to diabetes (e.g., topic). As such, the AI model may establish the topic of diabetes to be relevant to the individual and assign a relevancy value to the topic of diabetes (e.g., topic rankings 238).

Identified topics 216 and topic rankings 238 may be stored in a data repository (e.g., data repository 222 shown in FIG. 2B, or another data repository (not shown)) of data management system 102.

Over time, identified topics 216 and topics rankings 238 may be updated as new data is collected (e.g., audio data 230). Continuing with the above example, additional audio data that captures a conversation during which a new topic (e.g., such as a new medical condition) is discussed may be obtained and analyzed. Doing so may increase a relevancy value (e.g., topic ranking) for the new topic when compared to the topic of diabetes.

Once obtained, identified topics 216 and topics rankings 238 may be used to manage limited storage resources of a data management system by discriminating less relevant data from more relevant data in an automated manner.

Thus, as illustrated in FIGS. 2A-2C, the system of FIG. 1 may obtain and/or identify topic classifications and topic relevancy values (e.g., topic rankings) for data collected from various data sources. The topic classifications and/or topic relevancies may be used to manage requests for functionalities of a data repository (e.g., data repository 222). For example, relevant topics may be used to improve access controls (e.g., MFA) for requests for access to medical data stored in and/or by data management system 102.

Turning to FIG. 2D, a fourth data flow diagram in accordance with an embodiment is shown. The data flow diagram may illustrate a process for managing requests for functionalities of a data repository. Data flows, data processing, and/or other operations may be performed to manage requests for access to data (e.g., metadata, and/or other inherent information of the data) stored by data management system 102.

To manage the requests for functionality of the data repository (e.g., access to sensitive data stored in data repository 222), data management system 102 may receive a request from a device operated by a user (e.g., a requestor). For example, a requestor (e.g., data consumer 104, a user of user device 106, etc.) may initiate the request. The requestor may claim to be an authorized user of the data for which access has been requested; therefore, the request may include information usable for authenticating the identity of the requestor.

For example, a request for functionality of a data repository may include (i) identifiers of the requestor and/or the requesting device, (ii) device credentials 248 (e.g., credentials for verifying the device such as a digital certificate), (iii) requestor credentials 246 (e.g., credentials for verifying the requestor such as a username and password or personal identification number (PIN)), (iv) the requested functionality (e.g., view data, modify data, delete data, etc.), and/or (v) other information related to requesting functionality of the data repository.

Upon obtaining the request, data management system 102 may initiate an authentication process (e.g., authentication process 242) and/or a security question generation process (e.g., security question generation process 240) which may generate security questions (and corresponding correct responses to the security questions) for the authentication process, based on relevant data regarding the requestor (e.g., stored in data repository 222).

During security question generation process 240, less relevant data of data repository 222 may be discriminated from more relevant data stored in data repository 222 to identify requestor data (e.g., data stored in the data repository regarding the requestor) on which the security questions may be based. To discriminate less relevant requestor data from more relevant requestor data, security question generation process 240 may retrieve the topic classifications (e.g., topic classifications 220) for the requestor data from data repository 222. To do so, an identifier for the requestor data may be provided to data repository 222. The identifier may be provided based on the identifier for the requestor included in the request. In response to the identifier, data repository 222 may return the corresponding topic classifications 220 for the requestor data.

Once obtained, a rank ordering for the requestor data may be obtained using topic rankings 238. The rank ordering may be obtained by obtaining a quantification for each portion of the requestor data. For example, each topic of topic classifications 220 for a given portion of the requestor data may be given a corresponding weight using topic rankings 238 (e.g., a higher rank topic classification is given a higher weight). The weighted topic classifications for a given portion of the requestor data may be summed to obtain a quantification for the portion of the requestor data. The quantification may be used to rank order the portions of the requestor data from most relevant (e.g., highest value quantification) to least relevant (e.g., lowest value quantification).

The rank ordering may be used to select identifiers of the portions of requestor data for use in obtaining security questions.

For example, one or more identifiers (e.g., for portions of requestor data) may be selected from the rank ordering (e.g., by selecting one or more highest ranked identifiers). The selected identifiers may point to one or more of the portions of the requestor data that may document memorable experiences of the requestor. The identified portions of requestor data (e.g., the portions of the requestor data that may document memorable experiences) may be used to formulate the security questions (and corresponding correct responses).

Security question generation process 240 may use the identified portions of requestor data to identify an experience of the requestor on which to base a security question. The experience may include (i) participation in a medical procedure (e.g., biopsy, surgery, etc.), (ii) participation in an interaction between the requestor and a medical professional (e.g., a conversation with a nurse, physician, surgeon, etc.), and/or (iii) participation in a medical test (e.g., blood tests, a magnetic resonance imaging (MRI), etc.). For example, the requestor may have experienced an MRI that detected a torn ligament of the knee of the requestor. The requestor may have had a conversation with a surgeon, in which the requestor decided to undergo surgery in order to reconstruct the torn ligament.

Details of the identified experience may be collected during security question generation process 240 in order to formulate the security questions. For example, the details of an experience may include (i) a location regarding the experience (e.g., a location where the medical procedure or the medical test was performed, where the interaction took place, etc.), (ii) a reason for the experience (e.g., a reason for performance of the medical procedure or the medical test, the interaction occurring, etc.), (iii) a time period regarding the experience (e.g., when the medical procedure or medical test was performed, when the interaction took place, etc.), and/or (iv) other details concerning the experience (e.g., results of the experience, etc.).

The security questions may be formulated in such a manner as to not inadvertently disclose the experiences and/or details thereof (e.g., sensitive data of the requestor). For example, the security question may be formulated in the form of a question that does not implicate medical information such as: broadly phrased questions, questions for which the responses are selected from one or more options (e.g., multiple choice responses, which may include an option of "none of the above"), etc. In addition, two or more security questions may be based on different details of the same experience (e.g., the security questions may be related), and therefore may be posed in a series. For example, formulation of a second security question in a series may be based on a response (e.g., from the requestor) to a first security question in the series.

Security question generation process 240 may be performed using one or more AI models. For example, the AI model(s) may be trained to (i) identify experiences (e.g., and/or details of the experiences) based on ingested portions of data (e.g., highly relevant portions of requestor data), (ii) formulate one or more (e.g., a series of) security questions (e.g., by ingesting the highly relevant portions of requestor data and/or experiences identified from the requestor data), and/or (iii) perform other tasks and/or processes that may be included in security question generation process 240.

Security question generation process 240 may be initiated (i) based on a predetermined schedule (e.g., security question update schedule), (ii) when newly collected data is added to a repository (e.g., a notification may be received from data management system 102), and/or (iii) when prompted (e.g., by authentication process 242, and/or by data management system upon obtaining a request for functionality of the data repository).

Any number of obtained (e.g., formulated) security questions may be stored in a data repository (not shown). The stored security questions may be stored using a database that may be queried based on an identifier (e.g., an identifier of the requestor) or other information included in the requests received by data management system 102. For example, one or more security questions stored in the data repository may be retrieved as part of authentication process 242 (or by another process or system).

Authentication process 242 may include performance of a MFA process, which may include device authentication and/or user authentication. For example, authentication process 242 may include a verification of device credentials (e.g., a digital certificate) provided as a portion of the request information (e.g., device credentials 248). Authentication process 242 may include a verification of the claimed identity of the requestor (e.g., an authorized user) using one or more forms of user authentication. Authentication process 242 may also verify that the requestor (e.g., once authenticated) has permission for the requested functionality (e.g., based on metadata stored with the requested portion of data during data ingest process 206).

The requestor may be authenticated, for example, via (i) a username and password combination, (ii) a personal identification number (PIN), (iii) responses to security questions (e.g., for which the responses are known only to an authorized user), and/or (iv) other methods of user authentication (e.g., biometric-based authentication). The one or more forms of user authentication and/or device authentication used by authentication process 242 may be performed in any order without departing from embodiments disclosed herein.

For example, authentication process 242 may perform device authentication (e.g., to verify the digital certificate included in the request) before performing an initial user authentication (e.g., to verify the user credentials included in the request). If both the device and user are authenticated based on the device authentication and the initial user authentication, then the requestor may be prompted to respond to one or more of the security questions generated during security question generation process 240.

Authentication process 242 may prompt security question generation process 240 (e.g., or its data repository that stores security questions) to provide one or more security questions associated with the requestor. Data management system 102 may provide security questions obtained from security question generation process 240 (e.g., or its data repository) to the requesting device (e.g., user device 106). Upon obtaining the security questions, the requesting device may prompt the requestor to provide one or more responses to the security questions. The requestor may provide the one or more responses (e.g., user response 250) via the requesting device to authentication process 242.

Authentication process 242 may approve (or deny) the request for the functionality based on user response 250 (e.g., based on whether user response 250 matches the corresponding correct responses to the security questions that were generated during security question generation process 240). For example, if user response 250 matches the corresponding correct responses (e.g., within a tolerance), then the requestor may be authenticated as the authorized user (e.g., the requestor is likely to be the authorized user);

therefore, the request may be approved. Approving the request may include granting the requestor permission for (at least) the functionality.

Thus, using the data flows and processes shown in FIGS. 2A-2D, dynamic, relevant, and/or personal security questions may be automatically obtained (e.g., using topic rankings of topic classifications for portions of requestor data) for use in managing requests (e.g., authenticating requestors of the requests). Due to the nature of the security questions, a requestor that is an authorized user is significantly more likely to provide the correct responses to the security questions than a requestor that is not an authorized user (e.g., a malicious party).

In an embodiment, the one or more entities performing the operations shown in FIGS. 2A-2D are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIGS. 1-2D may perform various methods to manage requests for access to sensitive data. FIGS. 3A-3C illustrate methods that may be performed by the components of the system of FIGS. 1-2D. In the diagrams discussed below and shown in FIGS. 3A-3C, any of the operations may be repeated, performed in different orders, and/or performed in parallel with or in a partially overlapping in time manner with other operations. The methods described with respect to FIGS. 3A-3C may be performed by a data processing system, and/or another device.

Turning to FIG. 3A, a flow diagram illustrating a method for obtaining a classification and rankings for data in accordance with an embodiment is shown. The method may be performed by the system of FIG. 1. The following operations (e.g., 302-308) may be performed prior to obtaining a request for a functionality of a data repository, and/or may be performed in preparation for managing requests for functionalities of the data repository (discussed further with respect to FIG. 3C).

At operation 302, an audio transcript from a data source may be obtained. The audio transcript may be obtained by (i) receiving the audio transcript from a data source and/or another entity via communication by a data processing system, (ii) reading it from storage, and/or (iii) any other methods. The audio transcript may be based on an audio recording which may include a conversation between two people.

At operation 304, a transcription process may be performed using the audio transcript to obtain a text transcript. The transcription process may be performed by (i) processing the audio transcript into text data, (ii) providing the audio transcript to a third party or another entity to obtain the text transcript, and/or (iii) any other methods. For example, a data processing system may be trained to translate audio files to text files (e.g., natural language processing) through speech recognition. As an additional example, the audio transcript may be provided to third party and/or an external operating system to perform the transcription process through which the text transcript may be obtained.

At operation 306, an analysis of the text transcript may be performed. The analysis may be performed by (i) processing the text data, (ii) providing the text transcript to a third party and/or another entity to analyze the text data, and/or (iii) any other methods. For example, a data processing system may process the text transcript by identifying a semantic context of the text (e.g., selecting a meaning of a word based on context), identifying text with similar topic keywords and groups of information associated with the topic keywords, and/or any other methods.

At operation 308, topic classifications and topic rankings for the topic classifications may be identified based on the analysis of the text transcript. The topic classifications may be identified by (i) receiving information regarding topic classifications and topic rankings, (ii) generating the topic classifications and topic rankings, and/or (iii) via any other method to obtain topic classifications and topic rankings. Refer to FIG. 2C for additional details regarding obtaining the topic classifications and topic rankings.

The method may end following operation 308.

Thus, using the method shown in FIG. 3A, embodiments disclosed herein may facilitate automatic identification of topics that are relevant to a user, and rankings for the topics. The topic classifications and topics rankings may be used to classify data as being relevant to various topics that are relevant to a user.

Turning to FIG. 3B, a flow diagram illustrating a method of classifying data for topic relevancy in accordance with an embodiment is shown. The method may be performed by the system of FIG. 1. The following operations (e.g., 312-314) may be performed prior to obtaining a request for a functionality of a data repository, and/or may be performed in preparation for managing requests for functionalities of the data repository (discussed further with respect to FIG. 3C).

At operation 312, unclassified data (e.g., a portion of data) may be obtained from a data source. The unclassified data may be obtained by (i) receiving it from a third party and/or entity via communication by a data processing system (e.g., managing the data source), (ii) reading it from storage, and/or (iii) via any other method. The unclassified data may include data which has not been analyzed and/or categorized in regard to topics for which it may be relevant.

At operation 314, a topic identification process may be performed using the unclassified data and topic classifications to identify a topic classification of the topic classifications for the unclassified data. The topic identification process may be performed by classifying the data using an inference model or other type of data with respect to any number of topics, and filtering the topics based on the topics identified as being relevant to the user (e.g., the topic classifications).

The method may end following operation 314.

Turning to FIG. 3C, a flow diagram illustrating a method of managing requests for functionalities of a data repository in accordance with an embodiment is shown. The method may be performed by the system of FIG. 1.

At operation 322, a request for functionality of a data repository may be obtained from a requestor. The request may be obtained by (i) receiving the request from a data processing system or device, (ii) reading the request from storage, and/or (iii) via any other method. For example, the request may be obtained from the device operated by a user (e.g., the requestor) who initiated the request.

The request may be for a functionality of one or more available functionalities of the data repository, such as access to a portion of data regarding the requestor (e.g., sensitive data regarding the requestor). The requestor may claim to be the individual for which the portion of data is stored. Based on the request, the claimed identity of the requestor may be verified using various authentication methods (e.g., that may employ security questions to authenticate the identity of the requestor).

At operation 324, a security question is obtained using topic classifications for a portion of data stored in the data repository, and topic rankings for the topic classifications. The security question may be obtained by: (i) receiving the security question from a data processing system or another device (e.g., data management system 102 hosting security question generation process 240), (ii) reading the security question from storage (e.g., a data repository that stores security questions generated by security question generation process 240), and/or (iii) via any other method (e.g., by generating the security question).

For example, the security question may be generated by (i) performing topic classification for data stored in the data repository on behalf of the requestor (e.g., to obtain topic classified portions of the data), (ii) rank ordering the topic classified portions based on relevance to the requestor, (iii) selecting one or more most relevant the topic classified portions to identify past experiences of the requestor, and/or (iv) formulating security questions for the requestor based on details of the past experiences. Obtaining and/or generating the security questions may include obtaining and/or generating (e.g., formulating) corresponding correct responses to the security questions. For more details regarding the generation of security questions, refer to the discussion of FIG. 2D.

At operation 326, a response to the security question may be obtained from the requestor. The response may be obtained by (i) receiving the response from a data processing system or device (e.g., operated by the requestor), (ii) reading the response from storage, and/or (iii) via any other method. For example, the response may be input to the requesting device by the requestor upon being presented with the security questions. The response may be transmitted from the requesting device to a system managing the authentication process for the requestor (e.g., data management system 102).

At operation 328, a determination is made regarding whether to approve the request based on the response to the security question. The determination may be made by verifying the identity of the requestor using one or more forms of authentication as described with respect to FIG. 2D. The forms of authentication may include authenticating the claimed identity of the requestor based on the response to the security questions.

For example, authenticating the claimed identity of the requestor may include (i) obtaining the response from the requestor, (ii) obtaining the corresponding correct response to the security question, and/or (iii) comparing the response from the requestor and the corresponding correct response. For example, if the response from the requestor matches the corresponding correct response (e.g., within a tolerance), then the claimed identity of the requestor may be verified, and the request may be approved. However, if the response from the requestor does not match the corresponding correct response (e.g., within the tolerance), then the claimed identity of the requestor may not be verified, and the request may not be approved (e.g., the request may be denied).

If it is determined that the request is approved, then the method may proceed to operation 330 following operation 328. Otherwise, the method may proceed to operation 332 following operation 328.

At operation 330, in a first instance of the determination where the request is approved, the requestor may be granted permission for at least the functionality. The requestor may be granted permission by allowing the requestor access to at least the requested functionality (e.g., the requestor may be granted permission for more functionality than the requested functionality). For example, the requestor may be allowed access to functionality of the data repository (e.g., may download sensitive data) through a secure network channel established between the data repository (e.g., data management system 102) and the requesting device (e.g., end device).

The method may end following operation 330.

Returning to operation 328, the method may proceed to operation 332 following operation 328 when it is determined that the request is not approved.

At operation 332, in a second instance of the determination where the request is not approved, the requestor may be denied permission for the functionality. The requestor may be denied permission by (i) notifying the requestor via the requesting device that the request has been denied, (ii) refusing access to the requested functionality (e.g., the portion of data regarding the requestor), (iii) discarding the request without sending a notification, and/or (iv) via other methods.

The method may end following operation 332.

Thus, as illustrated above, embodiments disclosed herein may provide systems and methods usable to manage user requests for access to sensitive data stored in a data repository on behalf of the user. The requests may be managed (e.g., approved or denied) using an authentication process that is based in part, on dynamic, automatically generated (e.g., or updated) security questions that are relevant to the authorized user. The correct responses to the security questions are therefore more likely to be known to authorized users than to unauthorized users. The improved authentication process is more likely to (i) improve the security of sensitive data (e.g., by reducing the likelihood of access to the sensitive data by unauthorized users), and/or (ii) reduce disruptions in the computer-implemented service provided via the sensitive data (e.g., by increasing the likelihood of access to the sensitive data by authorized users).

Thus, embodiments disclosed herein may provide an improved computing device that is able to extract useful information from inference models, usable for management purposes. Further, the disclosed process may facilitate identification of relationships that a person may easily overlook. Accordingly, the disclosed process provides for both an embodiment in computing technology and an improved method for device management. Rather than relying on a person's intuition or expert knowledge, an automated process for analysis may be provided.

Figure 4:
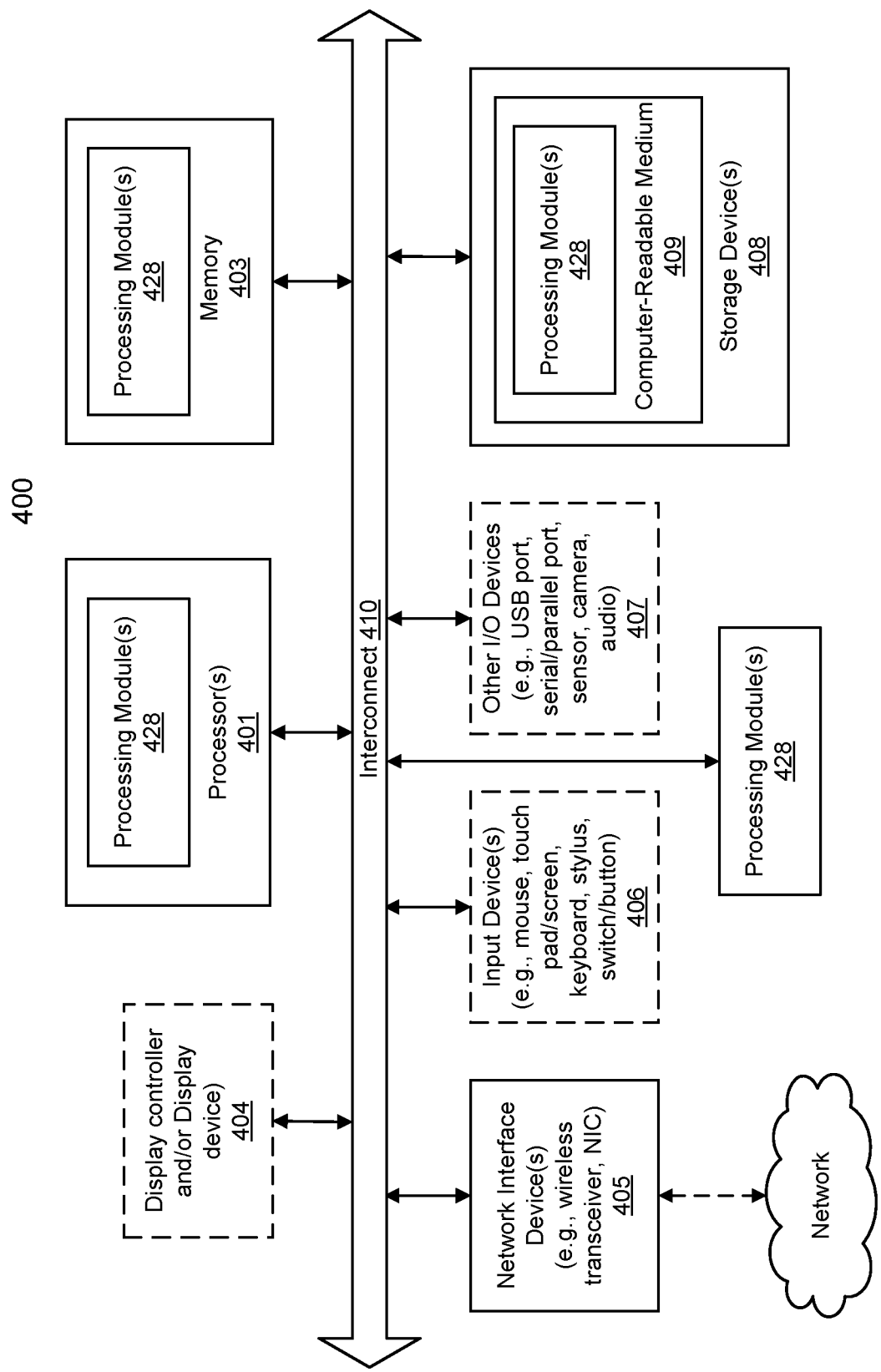
FIG. 4 shows a block diagram illustrating a data processing system in accordance with an embodiment.

Any of the components illustrated in FIGS. 1-3C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing requests for functionalities of a data repository, comprising:
   obtaining a request of the requests from a requestor, the request being for an access to a functionality of the functionalities of the data repository; and
   based on the request:
      obtaining a security question using topic classifications for a portion of data stored in the data repository and topic rankings for the topic classifications, the security question being formulated based on details of an experience of the requestor that happened to the requestor before the requestor provided the request for the functionality, and the experience is one experience from a group of experiences consisting of: participation in a medical procedure; participation in an interaction between a first individual and a medical professional; and participation in a medical test, wherein in an instance of the obtaining the security question where the experience is participation in the medical procedure, the details comprise a location where the medical procedure was performed, a reason for performance of the medical procedure, and a time period in which the medical procedure was performed;
      obtaining a response to the security question from the requestor;
      making a determination regarding whether to approve the request based on the response to the security question;
      in a first instance of the determination, approving the request to grant the requestor the access to the functionality; and in a second instance of the determination, rejecting the request to deny the requestor the access to the functionality.

2. The method of claim 1, wherein the requestor is the first individual, and the portion of the data is stored for the first individual.

3. The method of claim 2, wherein obtaining the security question comprises:
obtaining a rank ordering of the portion of the data based on the topic rankings;
selecting a highest ranked portion of the portion of the data based on the rank ordering; and
formulating the security question based on at least the highest ranked portion of the data.

4. The method of claim 3, wherein the details of the experience are documented in the portion of the data.

5. The method of claim 1, wherein in an instance of the obtaining the security question where the experience is participation in the interaction, the details comprise a location where the interaction took place, a reason for the interaction occurring, and a time period in which the interaction took place.

6. The method of claim 1, wherein in an instance of the obtaining the security question where the experience is participation in the medical test, the details comprise a location where the medical test was performed, a reason for performance of the medical test, and a time period in which the medical test was performed.

7. The method of claim 1, wherein the topic classifications are based at least in part on an audio transcript, the audio transcript being based on an audio file, the audio file comprising audio data based on at least one conversation between two people.

8. The method of claim 7, wherein the topic classifications comprise an enumeration of each unique topic of topics discussed during the at least one conversation between the two people captured in the audio transcript, and the two people comprise a first individual for which the data is stored, and a second individual which provides at least one service to the first individual.

9. The method of claim 1, further comprising:
prior to obtaining the request:
obtaining an audio transcript from a data source;
performing a transcription process, using the audio transcript, to obtain a text transcript;
performing an analysis of the text transcript; and
identifying, based on the analysis of the text transcript, the topic classifications, and the topic rankings for the topic classifications.

10. A non-transitory machine-readable medium having additional instructions stored therein, which when executed by a processor, cause the processor to perform operations for managing requests for functionalities of a data repository, the operations comprising:
obtaining a request of the requests from a requestor, the request being for an access to a functionality of the functionalities of the data repository; and
based on the request:
obtaining a security question using topic classifications for a portion of data stored in the data repository and topic rankings for the topic classifications, the security question being formulated based on details of an experience of the requestor that happened to the requestor before the requestor provided the request for the functionality, and the experience is one experience from a group of experiences consisting of: participation in a medical procedure; participation in an interaction between a first individual and a medical professional; and participation in a medical test, wherein in an instance of the obtaining the security question where the experience is participation in the medical procedure, the details comprise a location where the medical procedure was performed, a reason for performance of the medical procedure, and a time period in which the medical procedure was performed;
obtaining a response to the security question from the requestor;
making a determination regarding whether to approve the request based on the response to the security question;
in a first instance of the determination, approving the request to grant the requestor the access to the functionality; and
in a second instance of the determination, rejecting the request to deny the requestor the access to the functionality.

11. The non-transitory machine-readable medium of claim 10, wherein the requestor is the first individual, and the portion of the data is stored for the first individual.

12. The non-transitory machine-readable medium of claim 11, wherein obtaining the security question comprises:
obtaining a rank ordering of the portion of the data based on the topic rankings;
selecting a highest ranked portion of the portion of the data based on the rank ordering; and
formulating the security question based on at least the highest ranked portion of the data.

13. The non-transitory machine-readable medium of claim 12, wherein the details of the experience are documented in the portion of the data.

14. The non-transitory machine-readable medium of claim 10, wherein in an instance of the obtaining the security question where the experience is participation in the interaction, the details comprise a location where the interaction took place, a reason for the interaction occurring, and a time period in which the interaction took place.

15. The non-transitory machine-readable medium of claim 10, wherein in an instance of the obtaining the security question where the experience is participation in the medical test, the details comprise a location where the medical test was performed, a reason for performance of the medical test, and a time period in which the medical test was performed.

16. A data processing system, comprising:
a processor; and
a memory coupled to the processor to store instructions, which when executed by the processor, cause the processor to perform operations for managing requests for functionalities of a data repository, the operations comprising:
obtaining a request of the requests from a requestor, the request being for access to a functionality of the functionalities of the data repository; and
based on the request:
obtaining a security question using topic classifications for a portion of data stored in the data repository and topic rankings for the topic classifications the security question being formulated based on details of an experience of the requestor that happened to the requestor before the requestor provided the request for the functionality, and the experience is one experience from a group of experiences consisting of: participation in a medical procedure; participation in an interaction between a first individual and a medical professional; and participation in a medical test, wherein in an instance of the obtaining the security question where the experience is participation in the medical procedure, the details comprise a location where the medical procedure was performed, a reason for performance of the medical procedure, and a time period in which the medical procedure was performed;

obtaining a response to the security question from the requestor;

making a determination regarding whether to approve the request based on the response to the security question;

in a first instance of the determination, approving the request to grant the requestor the access to the functionality; and in a second instance of the determination, rejecting the request to deny the requestor the access to the functionality.

17. The data processing system of claim 16, wherein the requestor is the first individual, and the portion of the data is stored for the first individual.

18. The data processing system of claim 17, wherein obtaining the security question comprises:

obtaining a rank ordering of the portion of the data based on the topic rankings;

selecting a highest ranked portion of the portion of the data based on the rank ordering; and formulating the security question based on at least the highest ranked portion of the data.

19. The data processing system of claim 16, wherein in an instance of the obtaining the security question where the experience is participation in the interaction, the details comprise a location where the interaction took place, a reason for the interaction occurring, and a time period in which the interaction took place.

20. The data processing system of claim 16, wherein in an instance of the obtaining the security question where the experience is participation in the medical test, the details comprise a location where the medical test was performed, a reason for performance of the medical test, and a time period in which the medical test was performed.

* * * * *